Nov. 27, 1951   R. D. SMITH   2,576,544
MOTOR CAR SERVICE MECHANISM
Filed Aug. 28, 1945   5 Sheets-Sheet 1
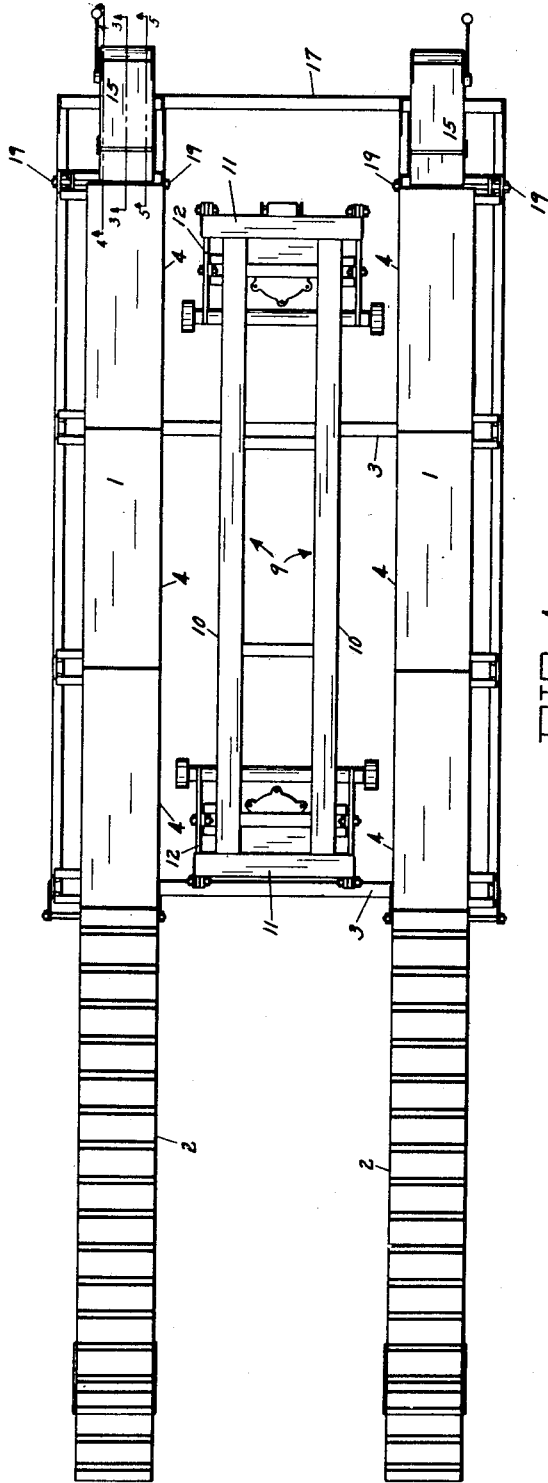
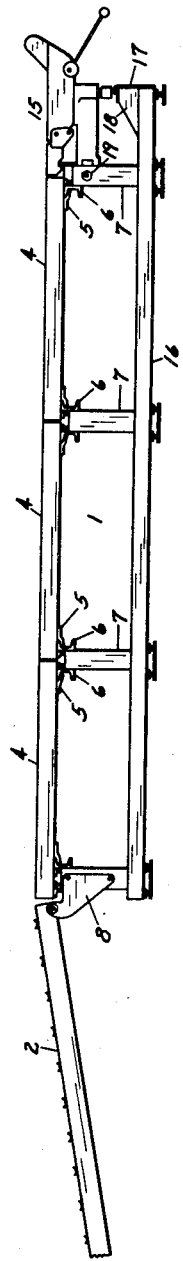
INVENTOR.
Roy D. Smith
BY
Merrill M. Blackburn
Atty.

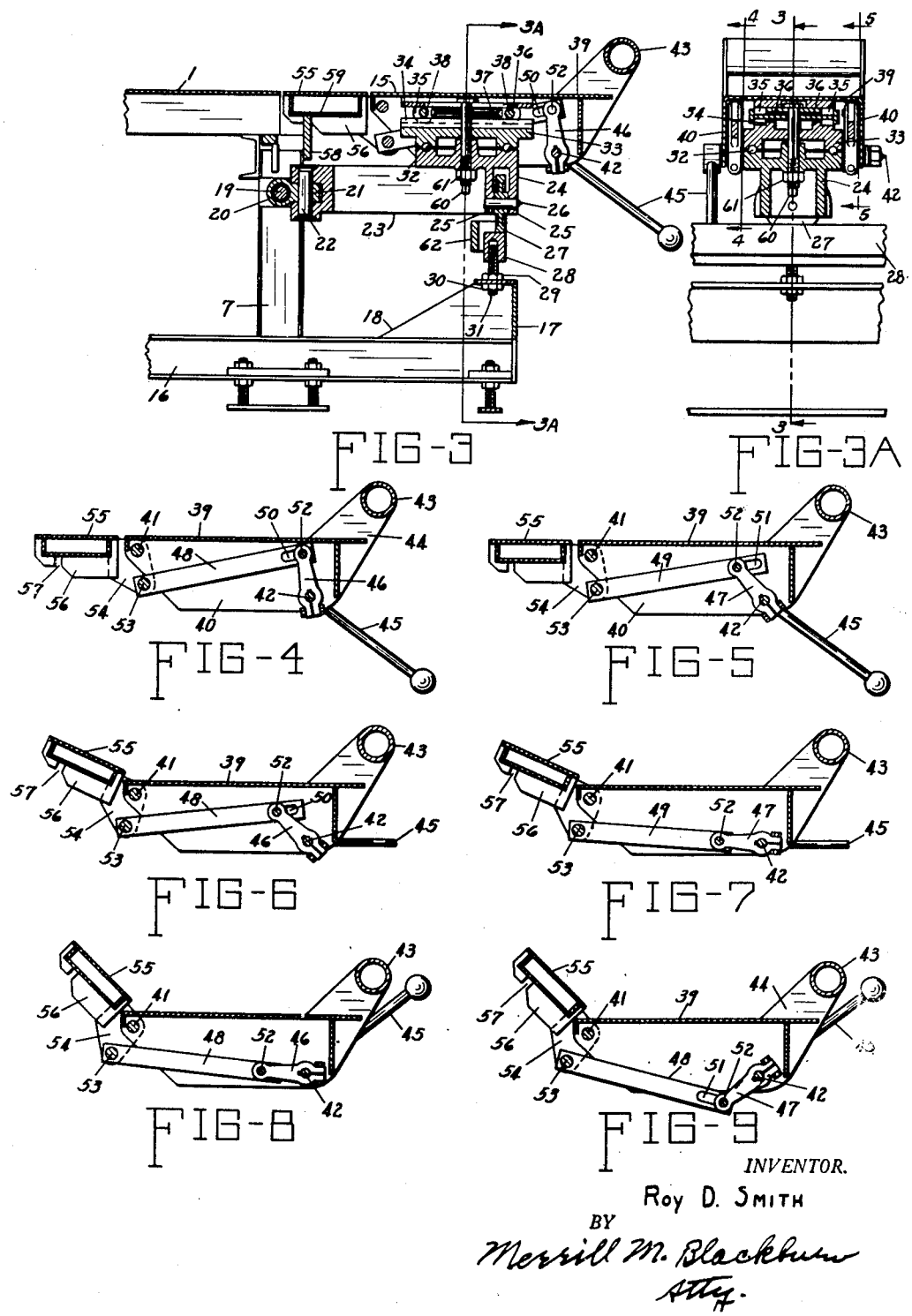

Nov. 27, 1951  R. D. SMITH  2,576,544
MOTOR CAR SERVICE MECHANISM
Filed Aug. 28, 1945  5 Sheets-Sheet 3

INVENTOR.
Roy D. Smith
BY
Merrill M. Blackburn
ATTY.

Nov. 27, 1951  R. D. SMITH  2,576,544
MOTOR CAR SERVICE MECHANISM
Filed Aug. 28, 1945  5 Sheets-Sheet 4

INVENTOR.
Roy D. Smith
BY
Merrill M. Blackburn
Atty.

Nov. 27, 1951           R. D. SMITH           2,576,544
MOTOR CAR SERVICE MECHANISM
Filed Aug. 28, 1945           5 Sheets-Sheet 5
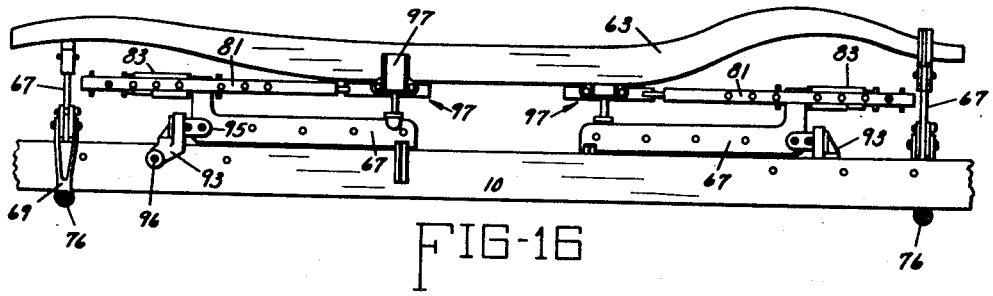
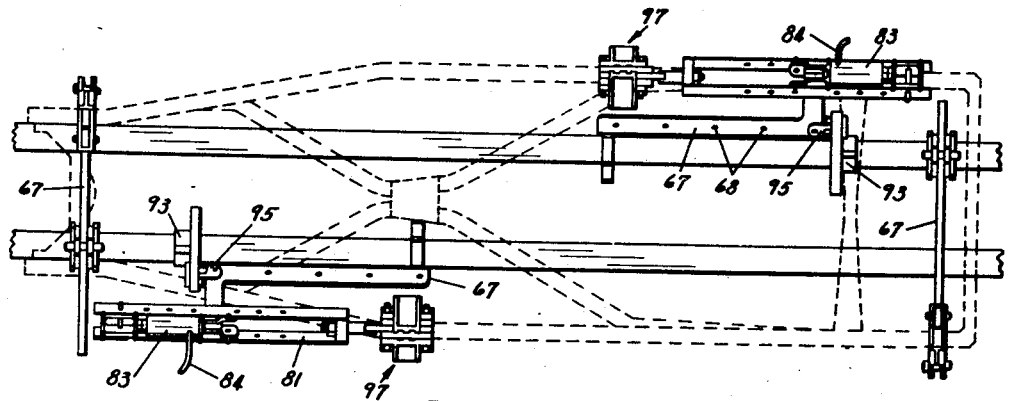
INVENTOR.
Roy D. Smith
BY
Merrill M. Blackburn
Atty.

Patented Nov. 27, 1951

2,576,544

UNITED STATES PATENT OFFICE 2,576,544

MOTORCAR SERVICE MECHANISM

Roy D. Smith, Mertzon, Tex., assignor to Bee-Line Company, Scott County, Iowa, a copartnership Application August 28, 1945, Serial No. 613,163

4 Claims. (Cl. 33—203.12)

My present invention relates to mechanism usable in checking the parts of motor cars and operating thereon to correct errors of form or adjustment. Among the objects of this invention are the provision of improved mechanism for performing the work indicated; the provision in an apparatus of the type indicated of improved safety mechanism; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents a plan view of a motor vehicle support and of supporting and lifting means for certain parts used in operating upon a motor vehicle;

Fig. 2 represents a side view of a part of the structure shown in Fig. 1;

Fig. 3 represents a longitudinal section of the front part of my present apparatus taken substantially along the plane indicated by the line 3—3, Fig. 1;

Fig. 3A represents a section taken substantially along the plane indicated by the line 3A—3A, Fig. 3;

Figure 10:
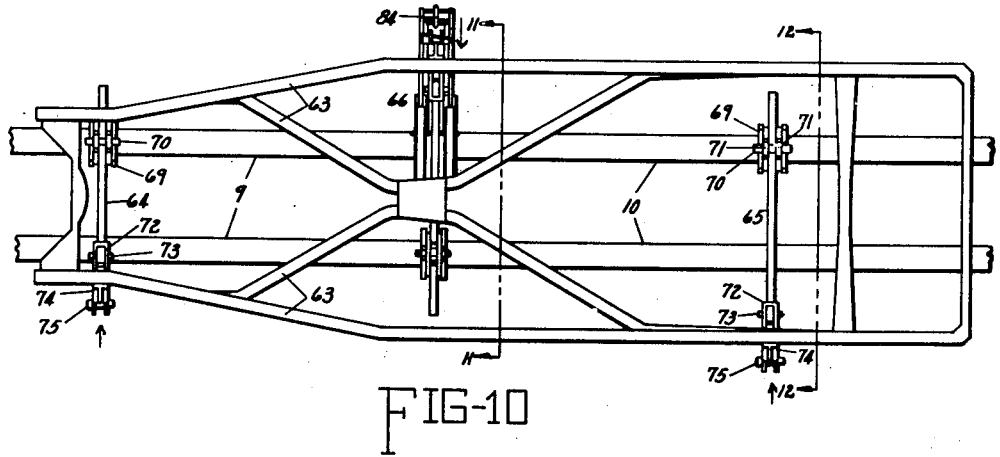
Figures 11, 11A:
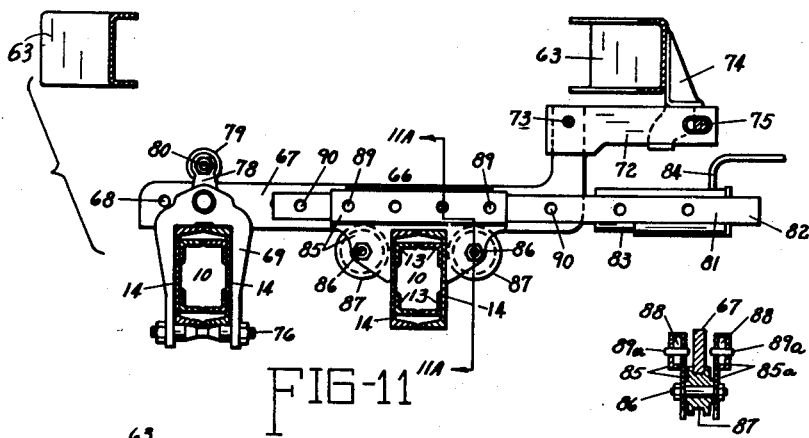
Figure 12:
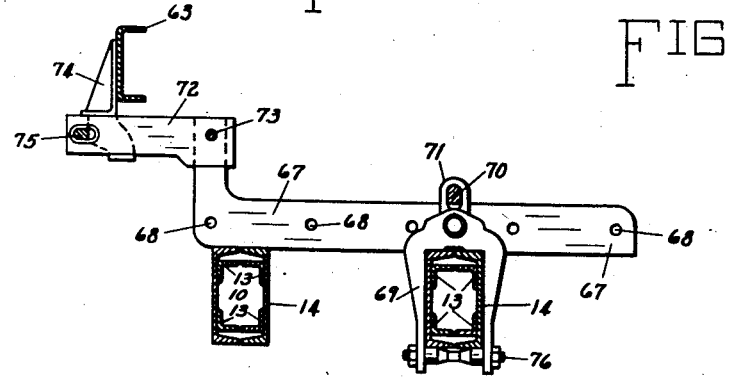
Figure 13:
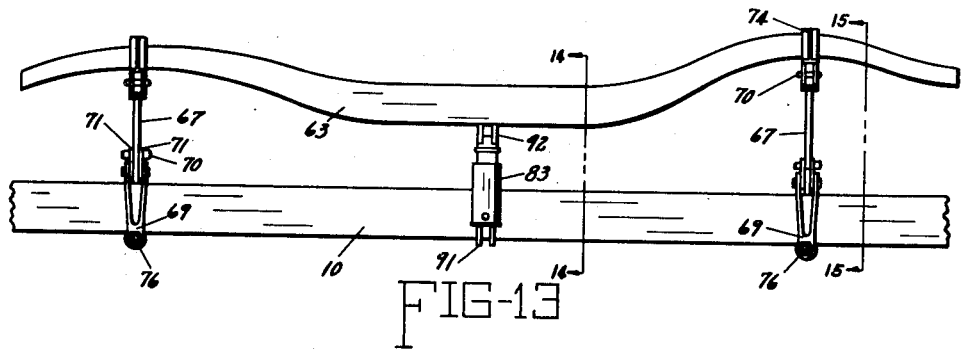
Figure 14:
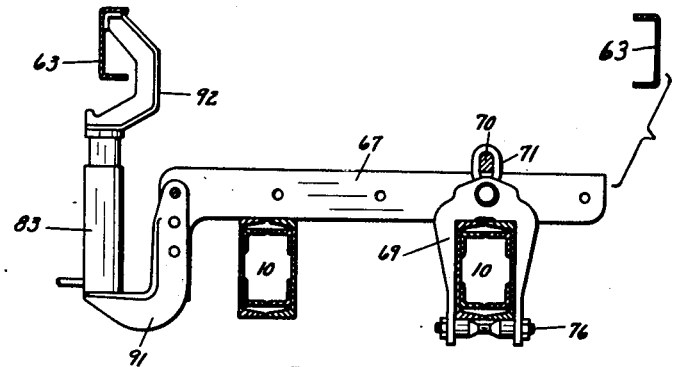
Figure 15:
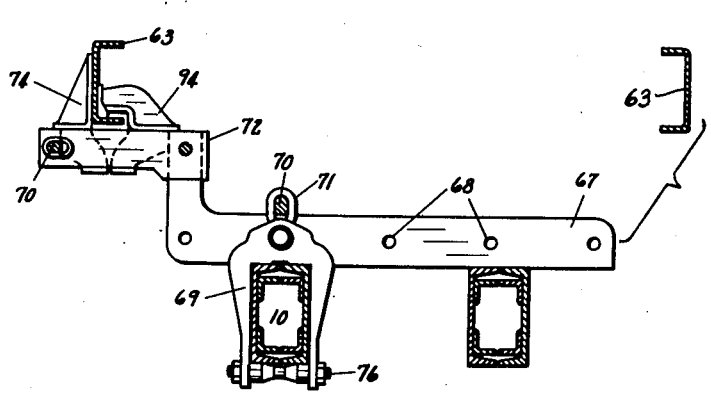

Figs. 4, 6, and 8 represent longitudinal sections of a part of the structure shown in Fig. 3, substantially along the plane indicated by the line 4—4, Fig. 1, with parts thereof being shown in different positions of adjustment;

Figs. 5, 7, and 9 represent similar longitudinal sections taken substantially along the plane indicated by the line 5—5, Fig. 1, and showing corresponding positions of another part of this apparatus, said figures corresponding to Figs. 4, 6, and 8;

Fig. 10 represents, in plan view, a motor vehicle frame superimposed upon the holding device for certain implements for operating upon said frame;

Fig. 11 represents a cross-section substantially along the plane indicated by the line 11—11, Fig. 10;

Fig. 11A represents a transverse section substantially along the broken plane indicated by the line 11A—11A, Fig. 11;

Fig. 12 represents a cross-section substantially along the plane indicated by the line 12—12, Fig. 10;

Fig. 13 represents, in side elevation, a part of the frame-correction mechanism and a side frame member of a motor vehicle;

Figs. 14 and 15 represent, respectively, transverse sections substantially along the planes indicated by the lines 14—14 and 15—15, Fig. 13;

Figs. 16 and 17 represent, respectively, side elevation and plan view of a frame-correcting mechanism, with a frame superimposed thereon.

The vehicle-supporting means, comprising the runways 1, approach ramps 2, and cross-ties 3, is somewhat similar to the structure disclosed in my prior Patent No. 2,045,109, issued June 23, 1936, but there are some differences. For example, the runway sections 4 are provided with guides 5 on their under side, shaped to engage under flanges of channel members 6. This engagement is sufficiently loose so that the sections 4 can be slid laterally for removal from the upright supporting means 7. The ramps 2 and the means 8 for securing same to the runways differ from the corresponding structures of my prior patent referred to above. Other differences will be apparent.

The implement-supporting unit 9 comprises a pair of side beams 10, cross members 11 connecting the ends of these beams, and pivoted end frames 12 by means of which the respective ends of the frame 9 may be independently raised. As shown in Figs. 11, 12, 14, and 15, these beams 10 are made up of a plurality of angle members 13 enclosed between channels 14 which are secured together facing each other. This makes a very strong and comparatively light means for holding the working members. This is quite necessary because of the great strain which is placed upon these beams during use of the machine. Since the two sides of this machine are similar, the structure of one side will be given and it will be understood that the same description applies to both sides.

At the forward end of the machine, in line with the runways, are devices for use in doing checking work on the front wheels of motor vehicles. These are indicated generically by the numeral 15 in Figs. 1 and 2, while the details of construction thereof are shown in Figs. 3, 3A, 4, 5, 6, 7, 8, and 9, and such construction will now be described in detail.

The lower frame-supporting element 16 has posts 7 secured thereto and, at its forward end, has an angle bar 17 extending across the machine from side to side, this angle bar being connected to the side rails 16 by gussets 18, shown most clearly in Fig. 3. A bar or shaft 19 passes through and connects corresponding posts 7 under each runway, as shown in Fig. 1. This shaft has a sleeve 20 slidable thereon, and each sleeve is provided with a lug 21 through which extends a pivot member 22, pivotally connecting the arm 23 to the lug 21. There is a casting 24 connected to the arm 23, and this casting swings in an arc about the pivot member 22 when the arm pivots about this member.

The casting 24 has a pair of ears 25 through which a pin 26 passes, and this pin has a wheel 27 mounted for rotation thereon. The wheel travels on the upper surface of a track 28 which may be adjusted vertically by means of the nuts 29 and 30 mounted on the bolt 31 which passes through the flange of the angle bar 17. By means of this construction, the casting 24 may be made to swing in a horizontal arc.

The casting 24 has a ball race formed in its upper surface in which are mounted balls 32 of a ball bearing. Another casting 33 is provided on its lower surface with a ball race to cooperate with the balls 32 in the suspension of the casting 33 and in giving this casting freedom of rotary motion. On its upper surface, the casting 33 is provided with flanges 34 which define trackways for the rollers 35. There is a frame 37 which ties the shafts 38 together, and the rollers 35 are on the ends of the shafts 38. Therefore, the elements 35, 37, and 38 form a carriage for indirectly supporting the top member 39 of the supporting mechanism 15.

The top member or plate 39 has downwardly extending flanges 40 at opposite sides which serve as supporting means for pivot members 41 and 42. A stop member 43 is secured to the flanges 40 and has the function of preventing the motor vehicle from inadvertently running off from the end of the supporting apparatus. Mounted on the end of shaft 42, upon the outside of the outside flange 40, is an operating handle 45 by means of which the cranks 46 and 47 may be turned about the axis of shaft 42 to cause reciprocation of the links 48 and 49. These links are provided with slots 50 and 51 to permit a limited amount of motion of the cranks 46 and 47 with relation to the links. It will be noted that the cranks 46 and 47 are not mounted on the shaft 42 in the same angular relation with reference to the handle 45. By comparison of Figs. 4, 6, and 8, on the one hand, and Figs. 5, 7, and 9, on the other, the operation of this mechanism will be clear. At their second ends, the links 48 and 49 are pivotally connected to a shaft 53 which connects levers 54 on the outside of flanges 40. These levers 54 are pivotally carried by the pivot member or shaft 41 and have the plate 55 connected thereto so that it will be raised from the position shown in Figs. 4 and 5 to that shown in Figs. 8 and 9. Plates 56, rigidly connected to the levers 54, constitute, in reality, extensions of those levers, and these plates 56 are provided with notches 57 for engagement with the transverse bar 58 extending across the front end of each runway. Therefore, when the plate 55 is down, as shown in Figs. 3, 4, and 5, as it must be for the approach of a vehicle wheel to checking position, the notch 57 and bar 58 prevent the plate 39 from being moved forwardly on the carriage 35, 37, 38, described above. Secured to the under side of the plate 55 is a box-like structure 59, the function of which is to serve as a reinforcement for the plate. The box-like structure also rests upon the bar 58 and consequently assists in holding the plate 55 up in proper position.

When the handle 45 is raised from the position shown in Figs. 4 and 5 to that shown in Figs. 6 and 7, the cranks 46 and 47 move toward the left, the shaft 52 sliding in the slot 50 but, being at the end of slot 51, it is compelled to push the link 49 to the left, raising the plate 55, as shown in Fig. 7. In this position, crank 47 secures link 49 and plate 55 against return to the position shown in Figs. 4 and 5, unless the handle 45 is moved. Movement of the handle 45 to the position shown in Figs. 8 and 9 turns the crank 46 into the position shown in Fig. 8, pushing the link 48 into the position there shown and raising lever 54 and plate 55, as indicated in Fig. 8. In this position, crank 46 secures link 48 and connected members 54, 55, and 56 against return movement, unless handle 45 is pushed downward toward the position shown in Figs. 4 and 5. In moving from the position shown in Fig. 7 to that shown in Fig. 9, the slot 51 permits shaft or pivot member 42 to move relatively to link 48. From the foregoing, it is clear that there are two locking positions for the plate 55, one being when shaft 42 is at the end of slot 51, as shown in Fig. 7, and the other when shaft 42 is positioned relatively to link 48, as shown in Fig. 8.

Because of the connection of plates or hook members 56 with the bar 58, it is impossible for the plate 39 to rotate about the bolt 60 when the wheels of the motor vehicle are turned to the right or left, when resting on plate 39, unless the handle 45 is raised to release the notch 57 from the bar 58. The lower end of the bolt 60 is made angular to permit the use of a wrench, when the nut 61 is being tightened up on this bolt, or the bolt is being screwed into casting 24. In assembling the parts, the bolt 60 is screwed into casting 24 until the head of bolt 60 just touches the upper surface of plate 36, and then the lock nut 61 is tightened up to hold the bolt in adjusted position. The head must not bear definitely upon the upper side of plate 36, since this must be free to move with relation to bolt 60. The wheels 35 and carriage 37 definitely hold the parts 33 and 39 against relative rotary motion. However, such motion between the castings 24 and 33 is definitely permitted by the ball bearings 32.

It is not regarded as necessary to set forth in this specification the method of checking with this apparatus, but it should be stated that the bar 62, connected to the ends of the track member 28 definitely prevents the wheel 27 from riding off from the end of the trackway and, consequently, prevents supporting assembly 15 from being swung too far to the right or left.

For a description of the tools to be used with the tool-holding frame 9 and the operation thereof, reference will now be made in greater detail to Figs. 10 to 17, inclusive. In these figures, in order to avoid confusion, only the frame of an automobile is shown and, in Fig. 17, this is shown in broken lines. The beams 10 of the tool-holding frame 9 are not shown in any detail in Fig. 10 but the detail is shown in cross-section in Figs. 11 and 12. The motor vehicle frame is indicated at 63 and tool-holding units 64 and 65 are shown in Fig. 10 as holding the front and rear portions of the frame against lateral movement when pressure is applied to the middle portion by the unit 66. The units 64 and 65 may be identical but are shown as being of two different lengths, although otherwise identical. The construction of these two units is shown in Fig. 12, while the construction of unit 66 is shown in Fig. 11.

The bar 67 of units 64 and 65 is shown as being rectangular in construction and as being provided with a plurality of holes 68. A clevis 69 surrounds one of the beams 10 and has a notch in the top thereof for reception of the bar 67 of units 64 and 65. A tapered pin 70 is passed through a pair of ears 71 connected to the clevis 69 and draws the latter into tight holding engagement with the bar 67. Therefore, an endwise pull on this bar will not cause the same to slip relatively to the beam 10 but the pulling force will be transmitted to the beam. A loop 72 is connected to an end portion of the bar 67 by means of a pin 73 and has an abutment member 74 extending through the opposite end thereof and held in place by means of a taper pin 75. This gives a rigid connection between the loop 72 and the abutment member 74 which engages one of the frame members 63 of the motor vehicle. A pin 76 extends through the legs of the clevis 79 and fixedly connects the same to the beam 10.

While the structure shown in Fig. 11 is the same in certain respects as that shown in Fig. 12, in other respects it differs therefrom. In the structure shown in Fig. 12, ears 71 are replaced by ears 78 having a roller 79 connected thereto by a pivot 80. This enables the bar 67 to slide longitudinally with respect to the beam 10. An elongated U-shaped yoke 81 has its closed end 82 located some distance from the bar 67 and between this closed end and the angle of the bar is located a jack 83 which may be supplied with power through the pipe 84.

There is a frame, made up of two parts 85 and 85a connected by bolts 86, on which are mounted grooved pulleys 87. The bar 67 rests in the grooves of these pulleys and is slidable transversely of the beams 10 under pressure by the jack 83. As shown in Fig. 11A, the frame members 85 and 85a have openings 88 therethrough, through which the arms of the yoke 81 are passed and in which they may be adjusted. These frame members have openings 89 through which pins 89a may be passed. The arms of the yoke 81 also have openings 90 which may be aligned with the openings 89 making it possible to pass the pins through openings 89 and 90, thereby connecting the yoke 81 and the members 85 and 85a, thus preventing relative sliding of these parts. These pins do not pass through the bar 67 and therefore it may slide relatively to the parts 81 and 85. This will cause movement of frame member 63 relatively to the correction beam 10, resulting in bending thereof, a necessary frame correction in certain instances. The relationship of the structures of Figs. 11 and 12 is shown in Fig. 10. The direction of the forces is indicated in Fig. 10 by the arrows at the sides of the frame.

In Fig. 13 there is illustrated the operation of eliminating frame sag. In this operation, a pair of clevises 69 are located upon opposite sides of the bend which is to be corrected, being connected by suitable hooks and links to the car frame members 63. As shown in Fig. 14, a hook 91 is connected to the short arm of a bar 67 and serves as a support for a jack 83. A correction tool 92 rests on the jack ram and pushes upwardly on the upper flange of frame member 63, causing bending of this frame member, as will be evident from Fig. 13.

In the operation illustrated in Fig. 15, links 72 are connected to the short arm of bar 67 and have an abutment member 74 held in place between them by a pin 70. A hook 94 engages in the channel of the frame member 63 and has its second end located between the links 72. By reference to Fig. 13, it will be seen that the holding force exerted by this unit is directed downwardly, the force of the jack being directed upwardly.

In Figs. 16 and 17 there is illustrated the operation of eliminating what is known in the art as "diamond frame." Abutments 93 are connected to the beams 10 and by links 95 to the bars 67. The abutments 93 are held against longitudinal motion by pins 96, passing through these abutments and cooperating holes in the beams 10. (See Fig. 16.) Clamps 97 grip the frame members 63 and, being connected to the pulling members 81, transmit force from the jacks 83 to the frame members. The pulling units being connected to the two frame members of the car which are held against any lateral movement, the pulling force causes the frame members to move longitudinally relatively to each other, resulting in a change in the angular relation of the parts of the vehicle frame.

It will of course be understood that the specific structure described above may be departed from without departing from the spirit of this invention as set forth herein and in the appended claims.

Having now described my invention, I claim:

1. In a motor vehicle checking apparatus having elevated runways and separate wheel supporting units at the forward end thereof and in alignment therewith, said wheel supporting units having fixed wheel stop means at the forward end thereof and movable stop means at the rear end thereof, and means for raising and lowering the last named means into and out of wheel blocking position, the raising and lowering means including as a part thereof a shaft, a pair of cranks secured to said shaft in other than parallel relation to each other, and links operatively connecting said cranks to said rear stop means, said links being provided with slots whereby to allow relative movement of the links as the cranks are turned.

2. A structure for the purpose indicated comprising a support for the dirigible wheels of a motor vehicle, an approach pivotally connected to the support, links connected to said approach to cause turning thereof about its pivotal connection, a shaft having a plurality of cranks connected to said links, said cranks being arranged in different angular relation to the shaft, and means for turning the shaft to cause raising and lowering of the approach about its pivotal connection.

3. A structure for the purpose stated comprising supports for the dirigible wheels of a motor vehicle, said supports being pivotally mounted to be rotated horizontally and mounted on horizontal tracks to be translated forwardly and backwardly, approaches to said supports whereby the dirigible wheels of a motor vehicle may reach said supports, said approach being mounted for pivotal motion in a vertical direction, and having latching means whereby it may be latched against horizontal motion, shafts, cranks connected to said shafts in non-parallel relation, and links connecting said cranks with said approach to raise and lower the same and to secure it in position against inadvertent lowering, at different points between elevated and lowered positions, said links having slots which allow relative motion between the cranks and the approach.

4. A checking apparatus for motor vehicle dirigible wheels comprising supports for said wheels, a forward stop at the forward edge of said supports, an elevatable approach at the opposite edge of said supports and normally in the plane of the wheel supports, said approach being pivotally connected to said support, and mechanism turning said approach about its pivotal connection into wheel-holding position, said mechanism including shafts, links, and cranks blocking the lowering of said approach, said cranks having connections with said links for moving said links and said shafts as the cranks are turned about their longitudinal axes, the cranks and links being turned into blocking positions as they are turned from approach position to operating position, the links being slotted so as to permit movement of the cranks as the shafts are turned about their longitudinal axes, the cranks having pins connecting them with the links, and the pins being slidable in the slots in the links.

ROY D. SMITH.

REFERENCES CITED

The following references are of record in the file of this patent:

UNITED STATES PATENTS

| Number | Name | Date |
| --- | --- | --- |
| 1,446,225 | Venable | Feb. 20, 1923 |
| 1,966,975 | Clapp | July 17, 1934 |
| 1,993,387 | Smith | Mar. 5, 1935 |
| 2,013,785 | Merrill | Sept. 10, 1935 |
| 2,020,614 | Miller | Nov. 12, 1935 |
| 2,042,856 | Merrill | June 2, 1936 |
| 2,045,109 | Smith | June 23, 1936 |
| 2,087,909 | Haucke | July 27, 1937 |
| 2,134,501 | Bennett | Oct. 25, 1938 |
| 2,137,949 | Phelps | Nov. 22, 1938 |
| 2,160,092 | Smalley | May 30, 1939 |
| 2,250,742 | Bennett | July 29, 1941 |
| 2,285,989 | Kroll | June 9, 1942 |

FOREIGN PATENTS

| Number | Country | Date |
| --- | --- | --- |
| 183,345 | Great Britain | July 27, 1922 |